(12) United States Patent
Hasegawa et al.

(10) Patent No.: US 8,354,813 B2
(45) Date of Patent: Jan. 15, 2013

(54) INVERTER DEVICE, ELECTRIC AUTOMOBILE IN WHICH THE INVERTER DEVICE IS MOUNTED, AND HYBRID AUTOMOBILE IN WHICH THE INVERTER DEVICE IS MOUNTED

(75) Inventors: Ryuta Hasegawa, Tokyo (JP); Ryuichi Morikawa, Tokyo (JP); Toshiharu Oobu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 338 days.

(21) Appl. No.: 12/808,001

(22) PCT Filed: Dec. 10, 2008

(86) PCT No.: PCT/JP2008/003688
§ 371 (c)(1),
(2), (4) Date: Sep. 1, 2010

(87) PCT Pub. No.: WO2009/078143
PCT Pub. Date: Jun. 25, 2009

(65) Prior Publication Data
US 2010/0320951 A1 Dec. 23, 2010

(30) Foreign Application Priority Data
Dec. 14, 2007 (JP) .................. 2007-322935

(51) Int. Cl.
*H02P 27/06* (2006.01)

(52) U.S. Cl. ........ 318/432; 318/801; 318/783; 318/434; 318/806; 361/24; 361/23; 361/33; 324/763.01; 324/764.01; 324/500; 324/415; 340/635; 363/17; 363/58; 363/98; 363/132; 363/50; 363/57; 363/136

(58) Field of Classification Search ............... 318/801, 318/783, 434, 432, 806; 361/24, 23, 33; 324/763.01, 764.01, 500, 415; 340/635; 363/17, 58, 98, 132, 50, 57, 136
See application file for complete search history.

(56) References Cited

U.S. PATENT DOCUMENTS

| | | | |
|---|---|---|---|
| 5,376,868 A * | 12/1994 | Toyoda et al. | 318/587 |
| 5,731,669 A * | 3/1998 | Shimizu et al. | 318/139 |
| 6,114,828 A * | 9/2000 | Matsunaga et al. | 318/782 |
| 6,339,310 B1 | 1/2002 | Sugiyama et al. | |

(Continued)

FOREIGN PATENT DOCUMENTS

JP    9 140155    5/1997

(Continued)

*Primary Examiner* — Rita Leykin
(74) *Attorney, Agent, or Firm* — Oblon, Spivak, McClelland, Maier & Neustadt, L.L.P.

(57) ABSTRACT

A torque limit section that applies limit to a torque instruction value of an electric motor such that a switching elements temperature is restricted to no more than an element upper limiting temperature includes a torque restriction section that finds a torque restriction value for restricting the torque of the electric motor in accordance with the said switching elements temperature; a torque restriction mitigation section that finds a torque restriction mitigation value for mitigating the torque limit value in accordance with the integrated value of the deviation of the element upper limiting temperature and the switching elements temperature; a first subtractor that finds a torque restriction value by subtracting the torque restriction mitigation value from the torque limit value; and a second subtractor that finds a limited torque instruction value obtained by subtracting the torque limit value from the torque instruction value and outputs this to the gate generating section.

14 Claims, 3 Drawing Sheets

U.S. PATENT DOCUMENTS

| | | | |
|---|---|---|---|
| 7,120,037 B2 * | 10/2006 | Komatsu et al. | 363/37 |
| 7,515,447 B2 * | 4/2009 | Ronkainen et al. | 363/141 |
| 7,663,329 B2 * | 2/2010 | Muta | 318/432 |
| 8,111,027 B2 * | 2/2012 | Nakayama | 318/400.15 |
| 8,138,711 B2 * | 3/2012 | Hwang et al. | 318/807 |
| 2001/0002782 A1 * | 6/2001 | Shimane et al. | 318/282 |
| 2004/0221217 A1 * | 11/2004 | Sato et al. | 714/745 |
| 2006/0175995 A1 * | 8/2006 | Shinmura et al. | 318/139 |
| 2007/0252548 A1 | 11/2007 | Moon et al. | |
| 2008/0181280 A1 * | 7/2008 | Wang et al. | 374/1 |

FOREIGN PATENT DOCUMENTS

| | | |
|---|---|---|
| JP | 10 210790 | 8/1998 |
| JP | 2001 69787 | 3/2001 |
| JP | 2007 300782 | 11/2007 |

* cited by examiner

INVERTER DEVICE, ELECTRIC AUTOMOBILE IN WHICH THE INVERTER DEVICE IS MOUNTED, AND HYBRID AUTOMOBILE IN WHICH THE INVERTER DEVICE IS MOUNTED

TECHNICAL FIELD

The present invention relates to an inverter device having an inverter that converts DC to AC by turning switching elements on/off and thereby drives and controls an electric motor, an electric automobile in which this inverter device is mounted, and a hybrid automobile in which this inverter device is mounted.

TECHNICAL BACKGROUND

Hybrid automobiles comprising a combination of an electric motor and an internal combustion engine, or electric motors that are employed in electric automobiles that are driven solely by an electric motor are driven by means of an inverter device. This inverter device drives the electric motor with a prescribed torque and frequency obtained by converting DC to AC. This inverter device is incorporated in the automobile and reduction in size thereof is desired, in order to ensure sufficient space within the vehicle to accommodate the driver and passengers etc.

The temperature of the switching elements of the inverter constituting the inverter device fluctuates considerably in accordance with the operating environment of the automobile: in particular, in the case of a hybrid automobile, the switching elements of the inverter reach a high temperature due to the effect of generation of heat by the internal combustion engine. In addition to such ambient temperature, the switching elements in the inverter are also raised in temperature due to the effect of steady losses caused by the current flowing in the switching elements themselves, and switching losses due to being turned on and off: if a certain temperature is exceeded, breakdown may even be caused.

In order to avoid breakdown of the switching elements, the inverter may be cooled or the temperature of the switching elements or inverter may be measured and the torque or switching frequency controlled accordingly. In order to improve inverter cooling, large heat radiating fins must be employed: however, if large heat radiating fins are employed, weight and volume are both increased. On the other hand, if the switching frequency is lowered, the ripple current is increased, which may cause the capacitor to generate heat or adversely affect controllability.

In view of these circumstances, generation of heat by the switching elements is ultimately suppressed by reducing the current flowing in the switching elements themselves by controlling the electric motor torque. For this reason, in some cases, it is arranged that, when the switching elements of the inverter exceed a prescribed temperature, torque control is initiated, in which torque control is applied proportional to the rise in temperature and rate of temperature change, so as to suppress generation of heat by the switching elements and avoid breakdown of the switching elements. An example of this is disclosed in Laid-open Japanese Patent Application No. H. 10-210790 (hereinbelow referred to as Patent Reference 1).

Also, the rate of temperature rise of the power transistor module may be detected, and action to protect the power transistor module performed if the rate of temperature rise exceeds a prescribed value. An example is found in Laid-open Japanese Patent Application No. H. 9-140155 (hereinbelow referred to as Patent Reference 2).

However, although Patent References 1, 2 describe applying a torque restriction when the switching elements exceed a prescribed temperature, no consideration was given to what amount of torque restriction would be suitable, depending on circumstances.

For example, if the amount of torque restriction is made proportional to the temperature of the switching elements, a proportionality constant that assumes a maximum ambient temperature should be employed for this proportionality constant. This is because, in order to reliably prevent breakdown of the switching elements, it is necessary to determine the amount of torque restriction assuming that the ambient temperature is in the highest condition. Consequently, in a condition in which the ambient temperature is low, a torque restriction is applied that is greater than necessary, which may result in uncomfortable handling when driving.

In order to minimize the amount of torque control, it is necessary to set the proportionality constant in accordance with the ambient temperature and, in order to achieve this, calibration for setting the proportionality constant, or introduction of a system for measuring the ambient temperature, is considered to be necessary. This complicates control and gives rise to the problems of lowered reliability or increased inverter volume and cost.

An object of the present invention is to provide an inverter device, electric automobile in which this inverter device is mounted, and hybrid automobile in which this inverter device is mounted wherein the amount of torque control needed for preventing rise in temperature of the switching elements can be minimized, wherein a higher power density of the inverter can be achieved by improving current throughput capability, and wherein handling comfort when driving can be improved and control simplified.

DISCLOSURE OF THE INVENTION

In order to achieve the above object, an inverter device according to the present invention is constructed as follows. Specifically, it comprises:

an inverter that drives and controls an electric motor by converting DC to AC by turning a switching element on and off;

a temperature detection section arranged in the vicinity of the switching element of aforementioned inverter and that detects the switching element temperature;

a gate generating section that controls the turning on and off of the switching element of aforementioned inverter such that the torque of aforementioned electric motor assumes a torque instruction value; and a torque restriction section that applies a restriction to the torque instruction value of aforementioned electric motor such that the switching element temperature is kept below the element limiting temperature obtained from aforementioned temperature detection section; wherein:

aforementioned torque restriction section comprises:

torque control means for finding a torque restriction value for restricting the torque of aforementioned electric motor in accordance with aforementioned switching element temperature;

torque restriction mitigation means that finds a mitigated torque restriction value for mitigating aforementioned torque restriction value in accordance with the integrated value of the deviation of aforementioned element upper limiting temperature and aforementioned switching element temperature;

a first subtractor for finding a torque restriction value by subtracting the mitigated torque restriction value found by aforementioned torque restriction mitigation means from the torque restriction value found by aforementioned torque restriction means; and a second subtractor that finds a restricted torque instruction value by subtracting the torque restriction value found by aforementioned first subtractor from aforementioned torque instruction value and outputs this to aforementioned gate generating section.

According to the present invention, the amount of torque restriction needed for preventing rise in temperature of the switching elements can be minimized, high power density of the inverter can be achieved by improving current throughput capability, and driver handling comfort can be improved and control simplified.

BEST MODE FOR PUTTING THE INVENTION INTO PRACTICE

An embodiment of an inverter device according to the present invention is described below with reference to the drawings.

Figure 1:
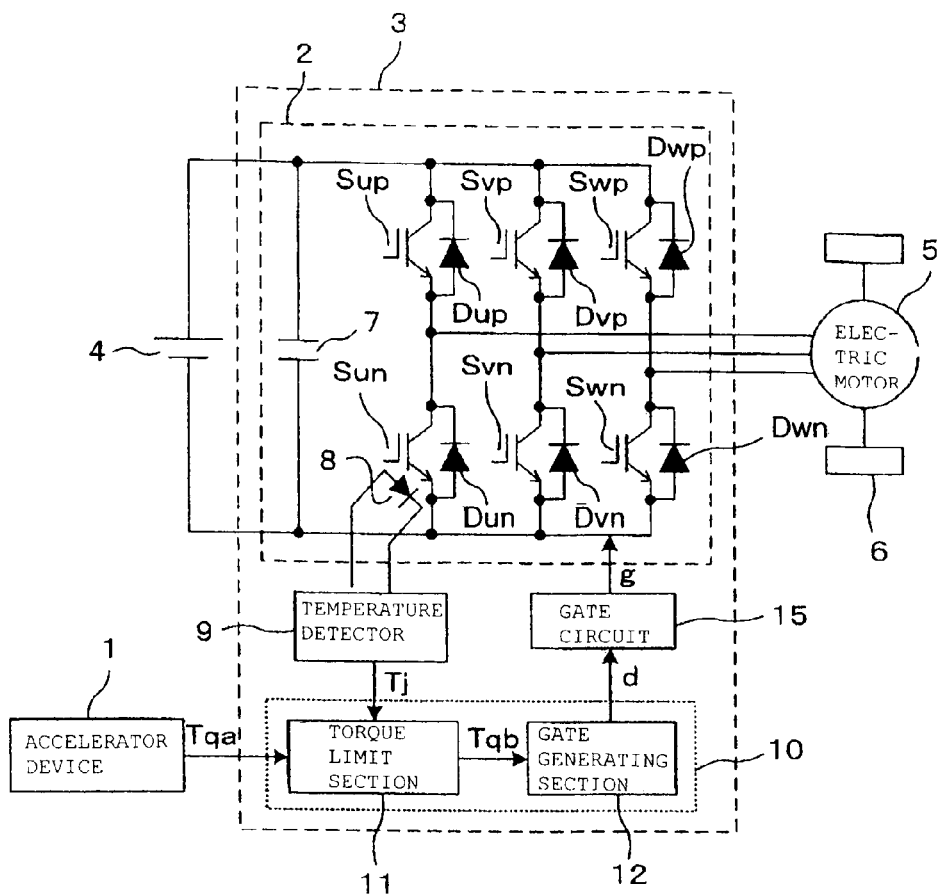
FIG. 1 is a layout diagram of an inverter device according to an embodiment of the present invention.

FIG. 1 is a layout diagram of an inverter device according to an embodiment of the present invention. FIG. 1 shows the case where an inverter device 3 is applied to an electric motor 5 of an electric automobile; however, the inverter device 3 according to this embodiment of the present invention is not restricted solely to electric automobiles and could also be applied to the electric motor 5 of for example an electrically propelled ship.

As shown in FIG. 1, an inverter device 3 comprises: an inverter 2 that converts DC from a DC power source 4 to AC, which it inputs to an electric motor 5; a temperature detector 9 that detects the temperature of a switching element S constituting part of an inverter 2; a gate circuit 15 that outputs a gate signal g to the switching element S constituting part of the inverter 2; and a control/calculation device 10 that is provided with a torque restriction section 11 and gate generating section 12.

A torque instruction value Tqa for the electric motor 5 is input to the inverter device 3 from an accelerator device 1. Specifically, the torque instruction value Tqa from the accelerator device 1 is input to the torque restriction section 11 of the control/calculation device 10 and the torque restriction section 11 applies a restriction to the torque instruction value Tqa as required, in accordance with the temperature of the switching element S of the inverter 2 that is detected by the temperature detector 9.

The limited torque instruction value Tqb that is output by the torque restriction section 11 has two cases, namely, a case in which the torque restriction value Tqa is directly output with no restriction applied, and a case in which the torque instruction value Tqa has a restriction applied to it so that a value different from the torque instruction value Tqa is in fact output. In the following description, the torque instruction value including these two cases will be referred to as the limited torque instruction value Tqb.

The limited torque instruction value Tqb that is output by the torque restriction section 11 is output to the gate generating section 12. The gate generating section 12 calculates a current instruction value d such that a torque satisfying the limited torque instruction value Tqb will be output by the electric motor 5, and outputs this current instruction value d to the gate circuit 15. The gate circuit 15 outputs to the switching elements S of the inverter 2 a gate signal g such as to obtain the current instruction value d. The inverter 2 converts the DC from the DC power source 4 to AC in accordance with the restricted torque instruction value and uses this AC to drive the electric motor 5 and control the vehicle wheels 6.

The inverter 2 comprises U phase, V phase and W phase bridge circuits constituted by switching elements S and having a capacitor 7 that smoothes the DC voltage connected in its input stage. The connection point of the switching element Sup and the switching element Sun of the U phase bridge circuit is connected with the electric motor 5. Free-wheeling diodes Dup, Dun are respectively connected in anti-parallel with the switching element Sup and the switching element Sun. Likewise in respect of the V phase, the V phase bridge circuit comprises switching elements Svp, Svn and free-wheeling diodes Dvp, Dvn. Also the W phase bridge circuit comprises switching elements Swp, Swn and free-wheeling diodes Dwp, Dwn.

A temperature sensor 8 is provided in the vicinity of any of the switching elements Sup, Sun, Svp, Svn, Swp, Swn or more than one of these. In this embodiment, the case where the temperature sensor 8 is a diode will be shown. The forward voltage of the diode tends to decrease when the temperature rises under constant current (steady current) conditions. The temperature of the switching element S is obtained by supplying a fixed current to the diode and measuring the forward voltage. The temperature sensor 8 could be a temperature sensor other than a diode, but is preferably of high response performance and high precision. The voltage that is output by the temperature sensor 8 is input to the control/calculation device 10 through the temperature detector 9.

The control/calculation device 10 comprises a torque limit section 11 and gate generating section 12. The torque limit section 11 inputs the switching element temperature Tj that is obtained from the temperature detector 9 and the torque instruction value Tqa that is transmitted from the accelerator device 1. The torque instruction value Tqa is subjected to torque limit in accordance with the switching element temperature Tj, causing a limited torque instruction value Tqb to be output to the gate generating section 12. The gate generating section 12 calculates a current instruction value such that the torque of the electric motor 5 becomes the limited torque instruction value Tqb, and outputs a gate signal such that this current instruction value is obtained to the gate circuit 15.

The gate circuit 15 is connected with all of the gates possessed by the switching elements Sup, Sun, Svp, Svn, Swp, Swn and performs on/off switching in accordance with the gate signal g that is input thereto from the control/calculation device 10.

Figure 2:
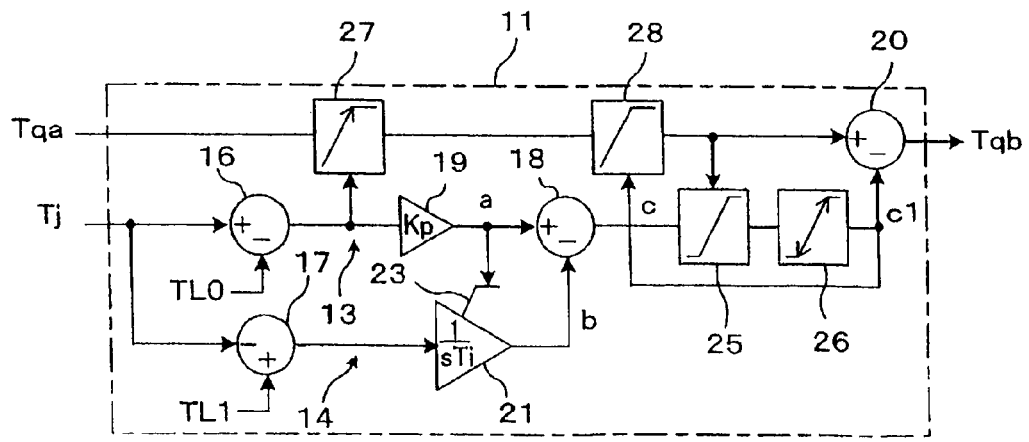
FIG. 2 is a block diagram of a torque restriction section in an embodiment of the present invention.

FIG. 2 is a block layout diagram of the torque limit section 11. The torque limit section 11 inputs the switching element temperature Tj that is detected by the temperature detector 9 and the torque instruction value Tqa: the torque instruction value Tqa is subjected to limitation in accordance with the switching element temperature Tj.

The switching element temperature Tj is input to torque restriction means 13 and torque restriction mitigation means 14 of the torque limit section 11. The torque restriction means 13 comprises a subtractor 16 and proportional amplifier 19: the subtractor 16 finds the deviation between the switching element temperature Tj and a preset torque limit commencement temperature TL0: the proportional amplifier 19 finds a torque restriction value a by multiplying this deviation by a proportionality constant Kp. The torque restriction value a that is thus found is input to a first subtractor 18.

The torque restriction mitigation means 14 comprises a subtractor 17, an integrator 21 and an integrated value upper-limit limiter 23: the subtractor 17 finds the deviation between a predetermined element upper limiting temperature TL1 and the switching element temperature Tj; the integrator 21 finds an integrated value by integrating this deviation; and the integrated value upper-limit limiter 23 finds the torque restriction mitigation value b by adding a restriction such that this integrated value cannot fall below the torque restriction value a. The torque restriction mitigation value b that is thus found is input to the first subtractor 18.

The first subtractor 18 finds the deviation of the torque restriction value a from the torque restriction means 13 and the torque restriction mitigation value b from the torque restriction mitigation means 14 and outputs this deviation as an initial torque limit value c. The initial torque limit value c is converted to a torque limit value c1 by passing through a torque limit value upper/lower-limit limiter 25 and torque limit value rate of change upper/lower-limit limiter 26 and this torque limit value c1 is output to a second subtractor 20.

Furthermore, the torque instruction value Tqa is input to the second subtractor 20 through the torque instruction value rate of change upper-limit limiter 27 and torque instruction value upper-limit limiter 28, and the second subtractor 20 subtracts the torque limit value c1 from the torque instruction value Tqa to find the limited torque instruction value Tqb, which is then output to the gate generating section 12.

The element upper limiting temperature TL1 is the set temperature when it is decided to restrict the switching element temperature Tj to no more than a given temperature. Also, the torque limit commencement temperature TL0 is the temperature when application of restriction by the torque limit section 11 in respect of the torque instruction value Tqa is commenced, and is set beforehand to a value that is below the element upper limiting temperature TL1.

The subtractor 16 of the torque restriction means 13 subtracts the torque limit commencement temperature TL0 from the switching element temperature Tj and the proportional amplifier 19 uses a value obtained by multiplying the result by a proportionality constant Kp as the torque restriction value a. In contrast, the subtractor 17 of the torque restriction mitigation means 14 subtracts the switching element temperature Tj from the element upper limiting temperature TL1 and a value obtained by integrating this by the integrator 21 at integration time intervals Ti is supplied for use as the torque restriction mitigation value b. In this case, a restriction is imposed by the integrated value upper-limit limiter 23 such that the torque restriction mitigation value b does not exceed the torque restriction value a.

A value obtained by subtracting the torque restriction mitigation value b from the torque restriction value a is employed as the initial torque limit value c. The initial torque limit value c is subjected to restriction by the torque limit value upper/lower-limit limiter 25 to be at least zero and is subjected to limitation to be no more than the torque instruction value Tqa obtained by passing through the torque instruction value rate of change upper-limit limiter 27 and torque instruction value upper-limit limiter 28. Also, restriction is applied to its rate of change by the torque restriction value rate of change upper/lower-limit limiter 26. Thus, it is output to the second subtractor 20 as the torque limit value c1 and is subtracted from the torque instruction value Tqa by this second subtractor 20, to newly obtain a limited torque instruction value Tqb.

The torque instruction value rate of change upper-limit limiter 27 serves to restrict the rate of rise of the torque instruction value Tqa to no more than a prescribed rate of change, when the switching element temperature Tj is higher than the torque limit commencement temperature TL0; the torque instruction value upper-limit limiter 28 serves to limit the torque instruction value Tqa to make the rise of the torque instruction value Tqa zero, when the initial torque limit value c exceeds zero.

Figure 3:
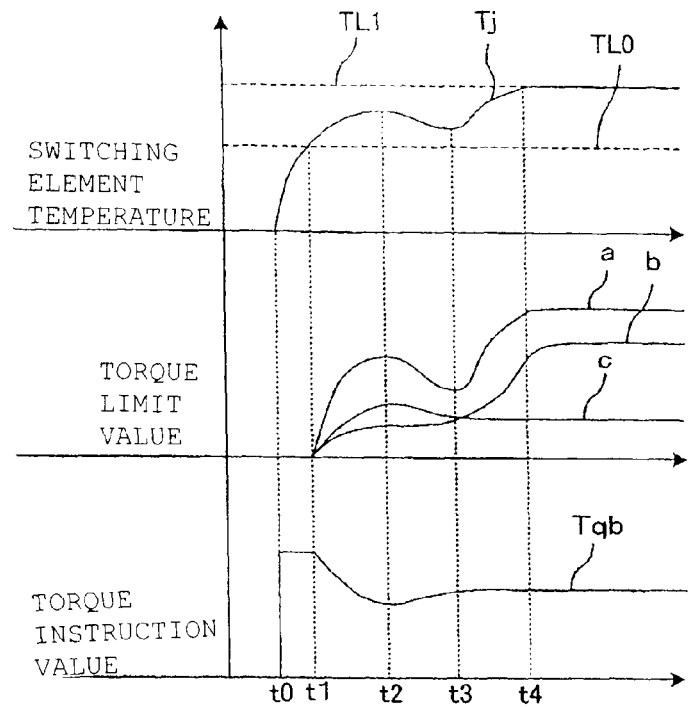
FIG. 3 is a view showing an operating characteristic in the case where the switching element temperature Tj of the inverter exceeds the element upper limiting temperature TL1 in an embodiment of the present invention.

Next, the operation will be described. FIG. 3 shows the operational characteristic when the switching element temperature Tj of the inverter in the embodiment of the present invention exceeds the element upper-limit temperature TL1. FIG. 3 shows the characteristic of the control that is exercised when the torque instruction value Tqa for the torque of the electric motor 5 that is emitted from the accelerator device 1 is such as to make the switching element temperature Tj exceed the torque limit commencement temperature TL0 and, furthermore, exceed the element upper limiting temperature TL1.

In this case, as shown in FIG. 3, when the switching element temperature Tj exceeds the torque limit commencement temperature TL0, the characteristic is such that a temporary drop takes place, followed by a rise, with the result that the temperature is ultimately limited to the element upper-limit temperature TL1.

Let us now assume that, at the time-point t0, a torque instruction value Tqa is transmitted from the accelerator device 1. At the time-point t0, the switching element temperature Tj is below the torque limit commencement temperature TL0, so the torque restriction value a has a negative value. Also, the torque restriction mitigation value b is zero. Consequently, the initial torque limit value c calculated by the first subtractor 18 has a negative value.

Since the initial torque limit value c is limited by the torque limit value upper/lower-limit limiter 25 so as to have a value of at least zero, the torque limit value c1 is zero. That is, the torque instruction value Tqa is not limited but is transmitted to the gate generating section 12 without modification, so that the desired torque is obtained. Consequently, in these circumstances, the limited torque instruction value Tqb is equal to the torque instruction value Tqa.

After this, the switching element temperature Tj rises up to the time-point t1 where the torque limit commencement temperature TL0 is reached: in other words, between time-point t0 and time t1, the switching element temperature Tj continues to rise, but since the switching element temperature Tj is below the torque limit commencement temperature TL0, the torque restriction value a has a negative value. Also, the integrated value of the integrator 21 is a positive value, but, since this is restricted by the integrated value upper-limit limiter 23 to be no more than the torque restriction value a, the torque restriction mitigation value b has a negative value. Consequently, the initial torque limit value c that is calculated by the first subtractor 18 has a negative value and, in the same way as in the case of the time-point to, the torque instruction value Tqa is not limited, so that the limited torque instruction value Tqb is the same as the torque instruction value Tqa.

Next, when, at the time t1, the switching element temperature Tj reaches the torque limit commencement temperature TL0, and, in addition, the torque limit commencement temperature TL0 is exceeded, the torque restriction value a assumes a positive value. Since an integrated value upper-limit limiter 23 is provided such that the torque restriction mitigation value b cannot become larger than the torque restriction value a, and since the value at the restriction commencement time-point is zero and little time has elapsed since the commencement of restriction, the value of the torque restriction mitigation value b is small i.e. it makes scarcely any contribution to torque restriction. Consequently, an initial torque limit value c that is substantially equal to the torque restriction value a is output from the first subtractor 18 and, at the second subtractor 20, a restricted torque instruction value b is obtained by subtraction from the torque instruction value Tqa of a torque limit value c1 that is substantially equal to the torque restriction value a.

Then, when the switching element temperature Tj rises further, the torque restriction value a increases, so the torque limit value c1 is also increased. Consequently, the limited torque instruction value Tqb becomes small, so the switching element temperature Tj is changed over to descent at the time t2. However, with lapse of time, the torque restriction mitigation value b increases, so the torque limit value c1 moves in the mitigated direction and the switching element temperature Tj therefore again rises at the time t3.

Then, at the time t4, when the switching element temperature Tj rises to the element upper limiting temperature TL1, the torque restriction mitigation value b, instead of increasing, becomes fixed. In this way, the action of mitigating the torque limit value c1 is stopped, so the torque restriction mitigation value b cannot increase, and the switching element temperature Tj therefore cannot exceed the element upper limiting temperature TL1. In this way, the switching element temperature Tj is held at the lowest possible element upper limiting temperature TL1: the initial torque limit value c can therefore be restricted to the minimum.

Figure 4:
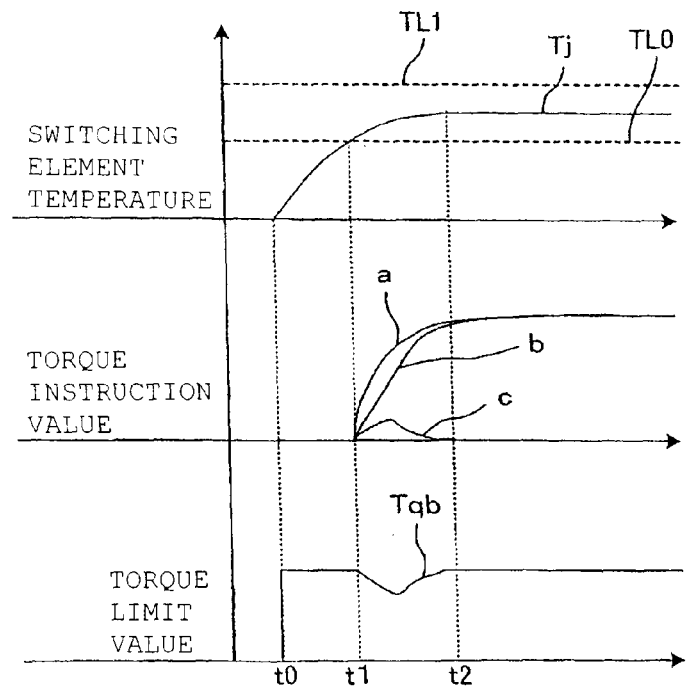
FIG. 4 is a view showing an operating characteristic in the case where the switching element temperature Tj of the inverter is held between the torque limit commencement temperature TL0 and the element upper limiting temperature TL1 in an embodiment of the present invention.

Next, FIG. 4 shows the operating characteristic when the switching element temperature Tj of the inverter according to an embodiment of the present invention is held between the torque limit commencement temperature TL0 and the element upper limit temperature TL1.

The torque instruction value Tqa is transmitted at the time t0 but no torque limit is applied until the switching element temperature Tj reaches the torque limit commencement temperature TL0. When, at the time t1, the switching element temperature Tj reaches the torque limit commencement temperature TL0 and, further, the switching element temperature Tj exceeds the torque limit commencement temperature TL0, the torque restriction value a increases, so torque limit is applied. On the other hand, an integrated value upper-limit limiter is provided such that the torque restriction mitigation value b cannot exceed the torque restriction value a, so, at the time-point of the time t1, this does not contribute to torque limit.

As shown in FIG. 4, if, finally, the switching element temperature Tj does not reach the element upper limiting temperature TL1, since the deviation of the element upper limiting temperature TL1 and the switching element temperature Tj is steady and large, the torque restriction mitigation value b continues to increase. This would therefore result in an action whereby control is applied such that the torque restriction mitigation value b tries to exceed the torque restriction value a so that, contrariwise, torque limit is applied in a negative direction i.e. a direction such as to increase the torque: however, in fact, the integrated value upper-limit limiter 23 is provided so that the torque restriction mitigation value b cannot exceed the torque restriction value a, and, at time t2, the torque restriction mitigation value b therefore becomes equal to the torque restriction value a. Initial torque limit value c=torque restriction value a−torque restriction mitigation value b=0, so, as a result, the torque limit value c1 becomes zero, and no torque restriction is applied.

In this way, at a torque instruction value Tqa that is approximately such that the switching element temperature Tj does not reach the element upper limiting temperature TL1, although torque limit may temporarily be applied, it can be ensured that the torque limit ultimately becomes zero. This therefore avoids the possibility of torque limit being unnecessarily applied in a condition in which the ambient temperature is low: thus there is no possibility of the operating comfort of the driver being impaired.

Next, the torque limit value upper/lower-limit limiter 25, torque limit value rate of change upper/lower-limit limiter 26, torque instruction value rate of change upper-limit limiter 27 and torque instruction value upper-limit limiter 28 will be described.

First of all, the torque limit value upper/lower-limit limiter 25 is a limiter that applies limit to the initial torque limit value c so that this is at least zero but is no more than the torque instruction value Tqa. This is in order to prevent the torque of the electric motor 5 from accidentally rising above the torque instruction value Tqa and to prevent the torque instruction value Tqa from becoming negative.

The torque limit value rate of change upper/lower-limit limiter 26 applies upper/lower limits to the rate of change of the initial torque limit value c that has already been subjected to limit by the torque limit value upper/lower-limit limiter 25. This is effective in application to a hybrid automobile in which an electric motor is operated for example in combination with an internal combustion engine. In a system in which the internal combustion engine output is used to supplement the torque that is restricted by the initial torque limit value c, supplementation by the internal combustion engine output can be achieved smoothly by suppressing the rate of change of the initial torque limit value c to less than the response speed of the internal combustion engine. As a result, driving can be performed in a comfortable fashion without the driver being conscious of application of torque limit. It is not necessarily essential to provide such a torque limit value rate of change upper/lower-limit limiter 26, but such a limiter may be employed to set suitable upper and lower limits in accordance with the application.

Next, the torque instruction value rate of change upper-limit limiter 27 is applied only when the switching element temperature Tj exceeds the torque limit commencement temperature TL0. If there is further rise in the torque instruction value Tqa in a condition in which the switching element temperature Tj is higher than the torque limit commencement temperature TL0, depending on the proportionality constant Kp or integration time T1 and the upper limiting value of the torque limit value rate of change upper/lower-limit limiter 26, it may not be possible for tracking of the torque limit to be maintained, with the result that the switching element temperature Tj may exceed the element upper limiting temperature TL1. This problem can be avoided if the rise of the torque instruction value Tqa in the torque instruction value rate of change upper-limit limiter 27 is delayed, so that torque limit can be applied before the switching element temperature Tj rises.

The torque instruction value upper-limit limiter 28 is employed only when the torque limit value c1 has exceeded zero. When torque limit is applied, the switching element temperature Tj either coincides with the element upper limiting temperature TL1 or is in a condition that is based on this. Consequently, since, if there is further increase in the torque instruction value Tqa, there is a high probability that the switching element temperature Tj will exceed the element upper limiting temperature TL1, arrangements are made to prevent increase in the torque instruction value Tqa. As a result, there is no possibility of the switching element temperature Tj exceeding the element upper limiting temperature TL1.

Figure 5:
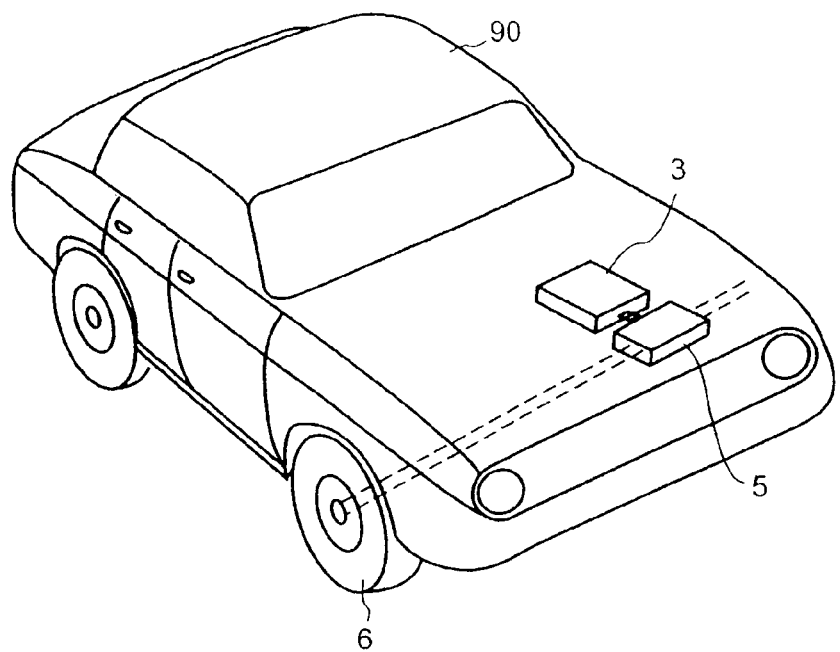
FIG. 5 is a simplified transparent perspective view of the case where an inverter device according to the present invention is incorporated in an electric automobile.

FIG. 5 is a simplified transparent perspective view of the case where the inverter device 3 described above is incorporated in an electric automobile.

In the vehicle body 90 of the electric automobile, the inverter device 3 described above is mounted in the interior of the front section of the vehicle body 90 and a three-phase electric motor 5 is provided that is supplied with power by this inverter device.

Propulsive force is supplied to the electric automobile by driving the vehicle wheels 6 by this three-phase electric motor 5. The method of supplying the propulsive force is performed by the method described above.

Figure 6:
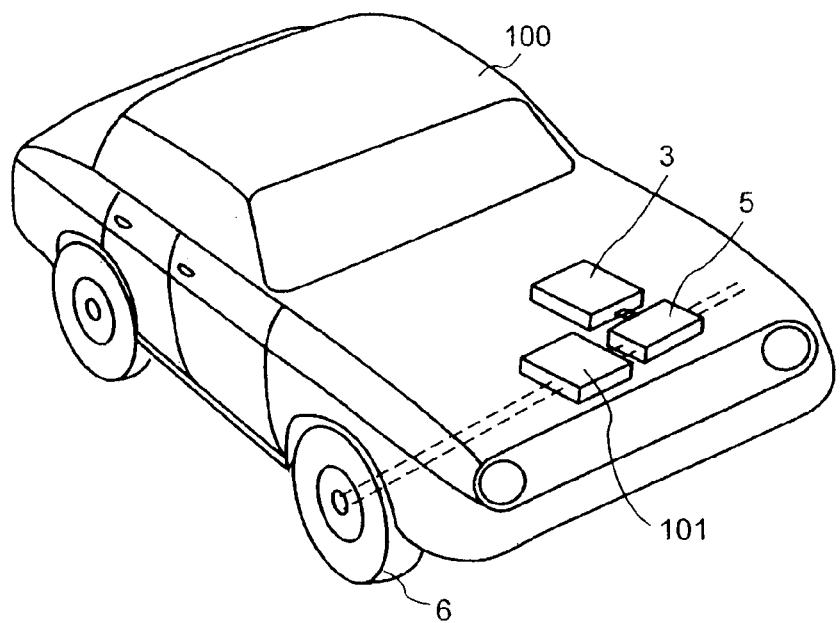
FIG. 6 is a simplified transparent perspective view of the case where an inverter device according to the present invention is incorporated in a hybrid automobile.

FIG. 6 is a simplified transparent perspective view of the case where the inverter device 3 described above is incorporated in a hybrid automobile.

In the vehicle body 100 of the hybrid automobile, the inverter device 3 described above is mounted in the interior of the front section of the vehicle body 100 and a three-phase electric motor 5 is provided that is supplied with power by this inverter device.

In the hybrid automobile, there is provided an internal combustion engine 101 that supplies drive force to the vehicle wheels 6 in cooperation with the three-phase electric motor 5.

Propulsive force is supplied to the electric automobile by driving the vehicle wheels 6 by this three-phase electric motor 5 and the internal combustion engine 101. The method of supplying the propulsive force by this three-phase electric motor 5 is performed by the method described above.

POSSIBILITIES OF INDUSTRIAL APPLICATION

As described above, with the present invention, in applying torque restriction when the switching element exceeds a prescribed temperature, the torque restriction is mitigated by the torque restriction mitigation means such that torque limit is not applied unnecessarily in a condition in which the ambient temperature is low, so torque limit can be suitably applied in accordance with circumstances, so that impairment of the operating comfort of the driver is prevented.

The invention claimed is:
1. An inverter device comprising:
an inverter that drives and controls an electric motor by converting DC to AC by turning switching elements on/off;
a temperature detection section that detects a switching elements temperature, arranged in a vicinity of said switching elements of said inverter;
a gate generating section that performs on/off control of said switching elements of said inverter such that a torque of said electric motor becomes a torque instruction value; and
a torque limit section that applies limit to said torque instruction value of said electric motor such that said switching elements temperature obtained from said temperature detection section is restricted to no more than an element upper limiting temperature,
wherein said torque limit section comprises:
torque restriction means that finds a torque restriction value for restricting a torque of said electric motor in accordance with said switching elements temperature;
torque restriction mitigation means that finds a torque restriction mitigation value for mitigating said torque restriction value in accordance with an integrated value of a deviation of said element upper limiting temperature and said switching elements temperature;
a first subtractor that finds a torque limit value by subtracting a torque restriction mitigation value found by said torque restriction mitigation means from said torque restriction value found by said torque restriction means; and
a second subtractor that finds a limited torque instruction value obtained by subtracting said torque limit value found by said first subtractor from said torque instruction value and outputs to said gate generating section.

2. The inverter device according to claim 1, wherein said torque restriction means finds, as said torque restriction value, a value proportional to a deviation of said switching elements temperature and a preset torque restriction commencement temperature that is lower than said element upper limiting temperature.

3. The inverter device according to claim 1, further comprising
an upper-limit limiter that limits said torque restriction mitigation value to no more than said torque restriction value.

4. The inverter device according to claim 3, further comprising
a torque restriction upper/lower-limit limiter that limits said torque limit value found by said first subtractor to a value of at least zero but no more than said torque instruction value.

5. The inverter device according to claim 3, further comprising
a torque restriction value rate of change upper/lower-limit limiter that applies a limit such that a rate of change of said torque instruction value is within a prescribed range.

6. The inverter device according to claim 3, further comprising
a torque rate of change upper-limit limiter that, when said torque restriction value found by said torque restriction means exceeds zero, limits said rate of change to no more than a prescribed value when said torque instruction value increases.

7. The inverter device according to claim 3, further comprising
a torque instruction value upper-limit limiter that, when said torque restriction value found by said first subtractor exceeds zero, applies a limit to an increase of said torque instruction value.

8. An electric automobile comprising:
(1) an inverter that drives and controls an electric motor by converting DC to AC by turning switching elements on/off;

a temperature detection section that detects a switching element temperature, arranged in a vicinity of said switching elements of said inverter;

a gate generating section that performs on/off control of said switching elements of said inverter such that a torque of said electric motor becomes a torque instruction value; and a torque limit section that applies limit to said torque instruction value of said electric motor such that said switching elements temperature obtained from said temperature detection section is restricted to no more than an element upper limiting temperature, wherein said torque limit section comprises:

torque restriction means that finds a torque restriction value for restricting a torque of said electric motor in accordance with said switching elements temperature;

torque restriction mitigation means that finds a torque restriction mitigation value for mitigating said torque restriction value in accordance with an integrated value of a deviation of said element upper limiting temperature and said switching elements temperature;

a first subtractor that finds a torque limit value by subtracting a torque restriction mitigation value found by said torque restriction mitigation means from said torque restriction value found by said torque restriction means;

a second subtractor that finds a limited torque instruction value obtained by subtracting said torque limit value found by said first subtractor from said torque instruction value and outputs to said gate generating section; and (2) an electric motor, mounted on said inverter device and that drives vehicle wheels by using AC power from said inverter device.

9. A hybrid automobile comprising:

(1) an inverter that drives and controls an electric motor by converting DC to AC by turning switching elements on/off;

a temperature detection section that detects a switching element temperature, arranged in a vicinity of said switching elements of said inverter;

a gate generating section that performs on/off control of said switching elements of said inverter such that a torque of said electric motor becomes a torque instruction value; and a torque limit section that applies limit to said torque instruction value of said electric motor such that said switching elements temperature obtained from said temperature detection section is restricted to no more than an element upper limiting temperature, wherein said torque limit section comprises:

torque restriction means that finds a torque restriction value for restricting a torque of said electric motor in accordance with said switching elements temperature;

torque restriction mitigation means that finds a torque restriction mitigation value for mitigating said torque restriction value in accordance with an integrated value of a deviation of said element upper limiting temperature and said switching elements temperature;

a first subtractor that finds a torque limit value by subtracting a torque restriction mitigation value found by said torque restriction mitigation means from said torque restriction value found by said torque restriction means;

a second subtractor that finds a limited torque instruction value obtained by subtracting said torque limit value found by said first subtractor from said torque instruction value and outputs to said gate generating section;

(2) an electric motor, mounted on said inverter device and that drives vehicle wheels by using AC power from said inverter device; and (3) an internal combustion engine that is jointly provided with said electric motor and that jointly drives said vehicle wheels.

10. The inverter device according to claim 2, further comprising an upper-limit limiter that limits said torque restriction mitigation value to no more than said torque restriction value.

11. The inverter device according to claim 10, further comprising a torque restriction upper/lower-limit limiter that limits said torque limit value found by said first subtractor to a value of at least zero but no more than said torque instruction value.

12. The inverter device according to claim 10, further comprising a torque restriction value rate of change upper/lower-limit limiter that applies a limit such that a rate of change of said torque instruction value is within a prescribed range.

13. The inverter device according to claim 4, further comprising a torque rate of change upper-limit limiter that, when said torque restriction value found by said torque restriction means exceeds zero, limits said rate of change to no more than a prescribed value when said torque instruction value increases.

14. The inverter device according to claim 10, further comprising a torque instruction value upper-limit limiter that, when said torque restriction value found by said first subtractor exceeds zero, applies a limit to an increase of said torque instruction value.

* * * * *